(12) United States Patent
Brasseur et al.

(10) Patent No.: US 6,439,997 B1
(45) Date of Patent: Aug. 27, 2002

(54) TELEVISION/INTERNET GAME SHOW

(76) Inventors: Edward N. Brasseur, 3327 Fenelon St., San Diego, CA (US) 92106; Mark A. O'Connell, 1549 Hornblend St., San Diego, CA (US) 92109

(*) Notice: Subject to any disclaimer, the term of this patent is extended or adjusted under 35 U.S.C. 154(b) by 121 days.

(21) Appl. No.: 09/651,823

(22) Filed: Aug. 30, 2000

(51) Int. Cl.[7] .................................................. A63F 9/24

(52) U.S. Cl. ........................................... 463/40; 700/91

(58) Field of Search ........................... 463/1, 16, 36, 463/25, 40–42, 29; 700/91–92; 273/138.1, 138.2, 139, 429, 459–461; 705/1, 10, 12, 14; 340/323 R; 434/307 R, 308, 322, 323; 348/552; 455/2.01, 3.05, 3.06; 379/93.13, 90.01, 92.01, 92.02

(56) References Cited

U.S. PATENT DOCUMENTS 5,508,731 A * 4/1996 Kohorn
6,343,990 B1 * 2/2002 Rasmussen et al. .......... 463/42

OTHER PUBLICATIONS

CBS: Survivor Game Show downloaded from web site <cbs.com/primetime/survivor/>, 20 pages.*
"Shop 'til You Drop" Game Show, by Troy Diggs, 2 pages.*
"Supermarket Sweep" Game Show, by Brian Rathjen and Troy Diggs, 3 pages.*
"Brewster's Millions" Movie released 1985, 1 page.*

* cited by examiner

Primary Examiner—Mark Sager
(74) Attorney, Agent, or Firm—Foley & Lardner; Bernard L. Kleinke

(57) ABSTRACT

A method for creating and providing information used in a television game show, where that information is obtained from the Internet. Users register and answer a questionnaire over the Internet, to create a user profile for each registered user. A fixed number of user profiles are randomly selected periodically, and then posted on the Internet. Users then vote for their favorite user profile, and the winner is given a large monetary award, to be presented live during a television broadcast. The winner must spend the large monetary award within a fixed period of time, or else lose the unspent portion of the award. Sponsors will provide the large monetary award each week, and will be given a prominent advertisement that will be posted on the pertinent Internet web site at which the users register and vote.

12 Claims, 6 Drawing Sheets

Figure 6

540 — Welcome to the Registration Web Page
for
"$ If I Had A Million Dollars $"

Please Enter the Following Information:

Name:
Address:
Phone:
E-mail:

[Click Here to Go to Vote Page]

Please Answer All of the Questions Below:

610

1. What is your favorite color?   Why?
2. Is the theory of evolution accurate?   Why/Why not?
3. List three hobbies.
4. What is your lucky number?   Why?
5. Do you own any pets?   Names and Descriptions.
6. What is your shoe size?   Your Spouse's?
7. Do you own a green dress?
8. What is your favorite vacation destination (been there or not)?
9. Who discovered electricity?
10. Do you eat macaroni and Cheese? What kind?
11. What small thing frustrates you? Why?
12. Who is Rembrandt?
13. Who is your favorite "Brady Bunch" character? Why?
14. You are on a desert island and you get to have one song, one kind of food and one game. What are they?
15. What size Blazer do you wear?
16. What is the most interesting item you own?
17. Do you own a black and white TV?   If so, why?
18. What is your favorite cheese?
19. What are your retirement plans?
20. Which is better, corn-on-the-cob or chili?
21. How do you relax?
22. Have you ever been to Disneyland?   How many times?   Favorite ride?
23. How many times have you played the lottery?   Ever win?
24. Do you believe in love at first site?
25. What kind of car do you drive?   Make, model, year, color
26. What is your favorite sports team?
27. Please add anything you would like, up to fifty words, that you think will help people vote for you should you become a finalist.

[Click Here to Go to "$ If I Had A Million Dollars $" Home Page]

Rules are stated
Do you agree to the rules?
Your Questionnaire Reference Number is (assigned by computer)

[Click Here When You Have Finished the Questionnaire]

TELEVISION/INTERNET GAME SHOW

BACKGROUND OF THE INVENTION

1. Field of the Invention

The present invention relates to a television show that also utilizes the Internet. In particular, the present invention relates to a television show featuring real people (not actors) who are given a large sum of money and a time frame in which to spend it or lose it, in which the Internet is used to select the people to be given the large sum of money.

2. Description of the Related Art

Television game shows are becoming increasing popular. For example, the television game show "Who Wants To Be A Millionaire" has been an extremely popular television program recently. Also, shows dealing with real people in real situations are currently very popular. For example, the television show "Survivor" reached an almost cult status and had fantastic ratings when it was aired in the summer of 2000. Needless to say, the Internet, or World Wide Web, is an extremely popular medium for people to obtain information, chat on-line, and purchase goods and/or services easily and quickly.

Therefore, it is desired to have a television game show that involves large sums of money, and that involves real people doing real-life things, and that also involves the Internet in some manner.

SUMMARY OF THE INVENTION

An object of the present invention is to have a television game show which involves real people, large sums of money, and which also involves the Internet in some manner.

This object may be achieved by a method for providing a television game show. The method includes a step of allowing users to register to win a prize to be given away on the television game show, where the registration is done over the Internet. The method also includes a step of allowing users to vote on a predetermined number of randomly selected user profiles, where the voting is done over the Internet. The method further includes a step of determining a winner based on the user profile having the most votes, and then broadcasting the winner receiving the prize on television. The method still further includes a step of videotaping the winner making purchases over a time frame in which the winner must spend the entire prize amount, where the videotaping is shown in real time over the Internet, and excerpts of the videotaping are shown as delayed video on an upcoming television broadcast.

The above-mentioned object may also be achieved by a computer program product that is used to create a television game show. The computer program product includes first program code that provides users access, via an Internet, to register to win a monetary prize to be given away on the television game show, wherein a user profile is created for each user as a result of the registering. The computer program product also includes second program code that randomly selects a fixed number of the user profiles and that displays the randomly selected user profiles on the Internet. The computer program product further includes third program code that provides users access, via the Internet, to vote on one of the randomly selected user profiles. The computer program product still further includes fourth program code that determines a winner based on one of the predetermined number of user profiles having maximum number of votes.

The above-mentioned object may also be achieved by a television game show. The game show includes means for selecting a winner for the television game show from a plurality of candidates, based on voting made by way of an Internet web site. The game show also includes means for presenting the winner with a monetary award. The game show further includes means for monitoring purchases made by the winner during a fixed time period, where the monitoring means includes a web site for users to watch the winner make the purchases.

BRIEF DESCRIPTION OF THE DRAWINGS

The invention will become more fully apparent from the following detailed description when read in conjunction with the accompanying drawings with like reference numerals indicating corresponding parts throughout, and wherein:

FIG. 6 shows an example of a questionnaire that may be utilized to register for the game show, according to an embodiment of the invention.

DETAILED DESCRIPTION OF THE PREFERRED EMBODIMENTS

A preferred embodiment of the present invention will be described in detail hereinbelow, with reference to the drawings.

The present invention is directed to a method for creating and presenting a television game show featuring real people who are given a large sum of money and have only a fixed time period to spend all of the money, or else they must give back the remaining amount of money that they were given.

The television game show utilizes information obtained from the Internet, in order to determine which person will be given the large sum of money for that week's show. Typically, one person per week will be selected to be given the large sum of money. The time period between consecutive awards may be something other than one week, such as twice per week or once every two weeks, while remaining within the scope of the invention. Also, the number of persons to be given an award may be more than one per show, while remaining within the scope of the invention.

The television game show will preferably be called "If I Had A Million Dollars", and will preferably utilize as its theme song, "If I Had A Million Dollars", by the Barenaked Ladies (assuming that proper authorization can be obtained). If a different amount of money is to be given away, the title for the television game show may be different. The present invention is not limited to one million dollar prize awards, but other large award amounts may be contemplated while remaining within the scope of the invention.

The television game show will preferably be a weekly, one-hour prime time major network show (e.g., broadcast between 8:00 and 10:00 p.m. on either NBC, CBS, ABC or FOX), which will include live and taped segments presented by an anchor or host in a studio setting, with film crews and reporters on location. One winner, or "Millionaire", will be selected weekly based on information gathered at a particular Internet website, [where that website is preferably entitled "Millionbucks.com."]. Each television show will feature a live notification of that week's winner, and a brief interview of the newest millionaire. The balance of the show will include live and taped highlights of previous winners going through their decision making processes, purchases and adventures.

Figure 1:
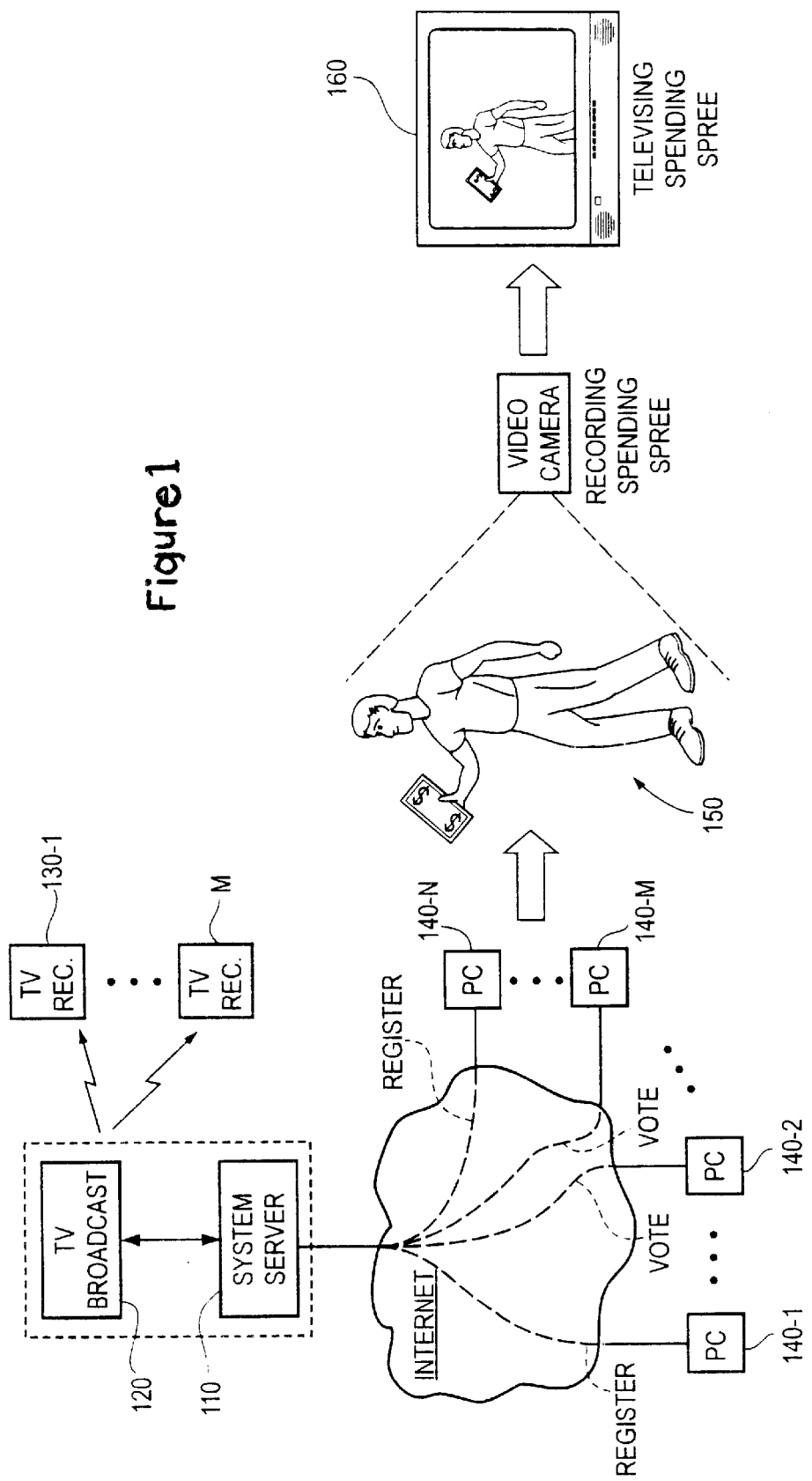
FIG. 1 is a diagram showing the fundamental features of the television/Internet game show, according to an embodiment of the invention.

FIG. 1 shows a diagram of the various elements involved in creating such a television game show. A system server 110 will store computer programs involved in providing information for the television game show (e.g., one computer program will use a random number generator to select finalists from a list of entries, another computer program will tally up votes to determine a winner). A television broadcast unit 120 will utilize the information obtained from users on the Internet and which is stored at the system server 110, in order to determine the winner for a current week's television program. The television broadcast unit 120 outputs a television signal, which can be received by viewers via their television receivers 130-A to 130-M. Such reception may be via satellite dish, cable television, UHF/VHF roof-top antenna, or the like. The system server 110 obtains information submitted by users on the web site for the television game show, where users can register, vote and send comments.

FIG. 1 shows PCs 140-1–140-N by which users can access the pertinent web site and perform various tasks related to the game show. FIG. 1 also shows a new winner 150 who is being recorded receiving his/her monetary award, where this event is preferably shown "live" on television and which is displayed on a television set 160 of a viewer. The viewer will witness, via live television, the monetary award being presented to the winner (and where the winner does not know that he/she won until that moment, thereby providing an element of surprise for the television show).

Figure 4:
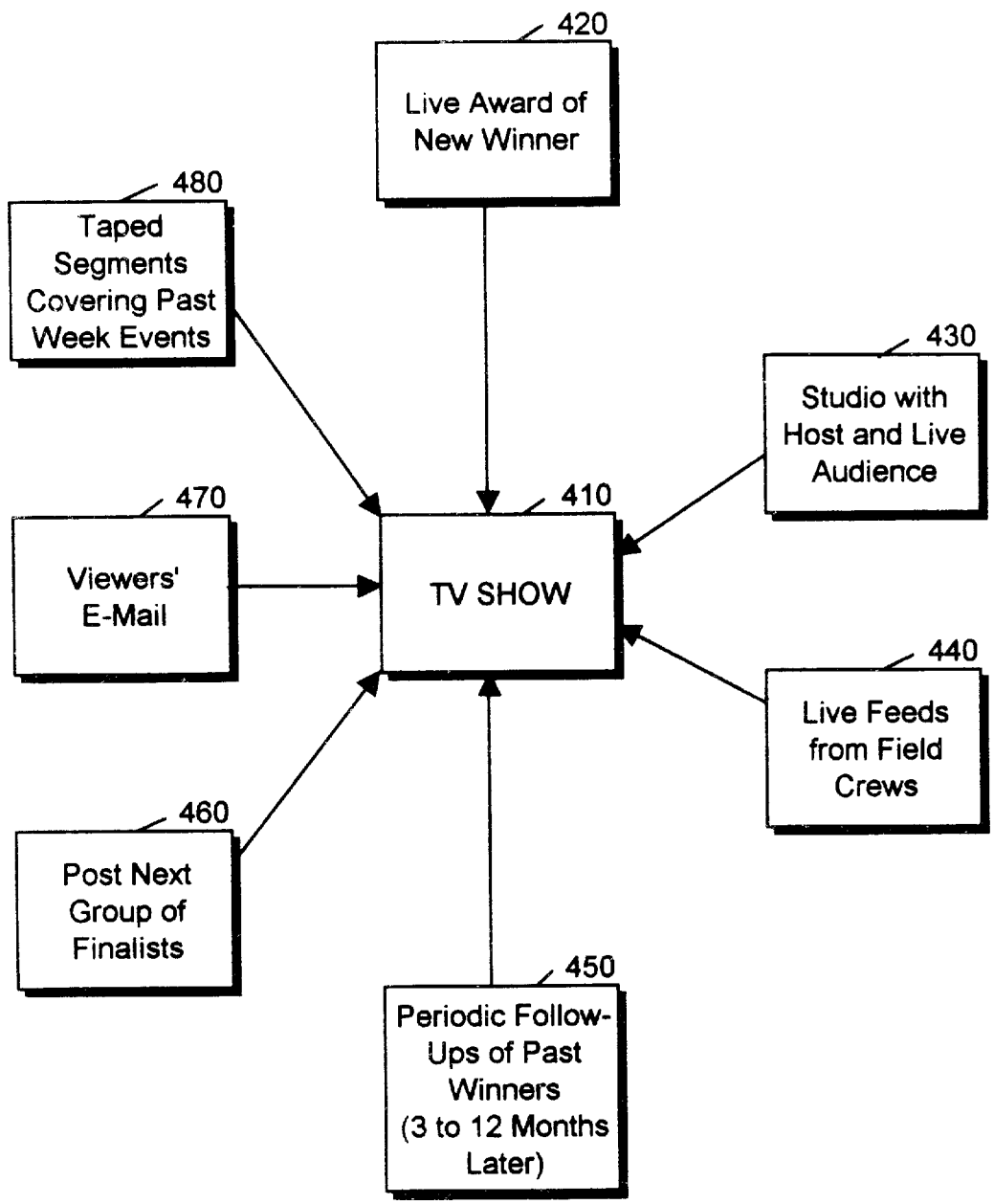
FIG. 4 is a flow chart of various inputs to the television show, according to an embodiment of the invention.

FIG. 4 shows the various inputs that are utilized in creating the weekly television show 410. Those inputs include: a) a live award presentation to the new winner 420, b) a studio with a host and a live audience 430, c) live feeds from field crews (e.g., following past weeks' winners spending their monetary award within their allotted time period to do so) 440, d) periodic follow-ups of past winners (e.g., three to twelve months later) 450, e) a listing of a next group of finalists to be voted on 460, f) viewer's e-mail questions and comments 470, and g) taped segments covering the past weeks' events (e.g., taped segments of past weeks' winners making their purchases within their allotted time period to do so) 480.

The selection process for obtaining a winner of the $1,000,000 award is explained in detail below. All potential winners have to register at the pertinent website, ["MillionBucks.com."]. Each potential winner (or "contestant") fills out a questionnaire that can be found on the web site. A computer program will randomly select ten entries per week, from a database of all current entries, to become that week's finalists. The computer program may be located at a same server in which the software for the maintaining and presenting the web site is stored, but it may also be located separate from the server (with a secure link from the server computer to the separately-located computer), for enhanced security purposes.

The ten finalist's questionnaires will be posted on the website, and read and voted on by the viewers via the website. The finalist with the most votes will become the winner for the next week's television show (as determined by either software run on the server computer or on a separately-located computer). The new millionaire will then be notified in-person, live, on the television show, and will be presented with the monetary award and with a winner's jacket. Preferably, the inner's jacket is an audacious, gold-glittered blazer with a dollar sign emblazoned on the breast of the jacket. The winner's jacket may also include a logo of the current week's sponsor in a prominent location (e.g., on the back of the jacket).

In order to qualify as a contestant, a contestant has to be at least eighteen years old, a United States citizen, and not be currently serving time in jail, where these qualification criteria are by way of example and not by way of limitation. While other restrictions may be required by law, the intent it to make it as easy as possible to qualify, and to open up the contestant eligibility criteria to as much people as possible.

The general rules of the television/Internet game show will be explained in detail below. The winner will be verified to meet all applicable qualifications and will have to agree (in writing, preferably when the questionnaire was submitted on-line) to be followed by a film crew for twenty-four hours a day for the fixed time period in which he/she has to spend the award. Preferably, the fixed time period is thirty days, but other time periods may be contemplated while remaining within the scope of the invention. The winner has to spend the one million dollars in the thirty day period, or give it back. One alternative for the game show is that the winner must give back the money that he/she did not spend, and another alternative for the game show is that the winner must give back the entire one million dollars, even though he/she may have spent most of it.

According to spending rules in the preferred embodiment, the money must be spent on tangible personal property only, with the following exceptions:
  a) primary residence, up to $200,000.00, but the winner must close escrow within the thirty day period;
  b) college tuition, up to $50,000.00, for the winner or the winner's children;
  c) investments, up to $100,000.00;
  d) charitable contributions, up to $200,000.00;
  e) pay off existing debt, up to $20,000.00;
  f) parties, no limit on costs expended during the thirty day period;
  g) trips, including taking people along, no limit on costs expended during the thirty day period;
  h) legal gambling, up to $100,000.00;
  i) The "Thank You", at least $10,000.00 and with no upper limit;
  j) Gifts to Others, $1,000.00.

The new millionaire must wear the winner's jacket whenever he/she is out in public. If he/she does not meet this requirement, the time period to spend the monetary award will end immediately. This constraint will give extra publicity to the television show and to the sponsor of that's weeks monetary award. Any and all illegal activities and/or purchases are strictly prohibited, and will result in forfeiture of the monetary award.

As explained above, a user registers for the game show via the Internet, and the user also votes for the current list of weekly contestants via the Internet (e.g., at the web site

[MillionBucks.com]). The name of the web site will be mentioned several times during each week's television broadcast, to give it strong name recognition.

At the home page of the web site, there will be links to the following features:

a) questionnaire/registration;

b) voting for the winner of this week's contest;

c) sponsor of the week;

d) purchase search engine;

e) on air.

Figure 3:
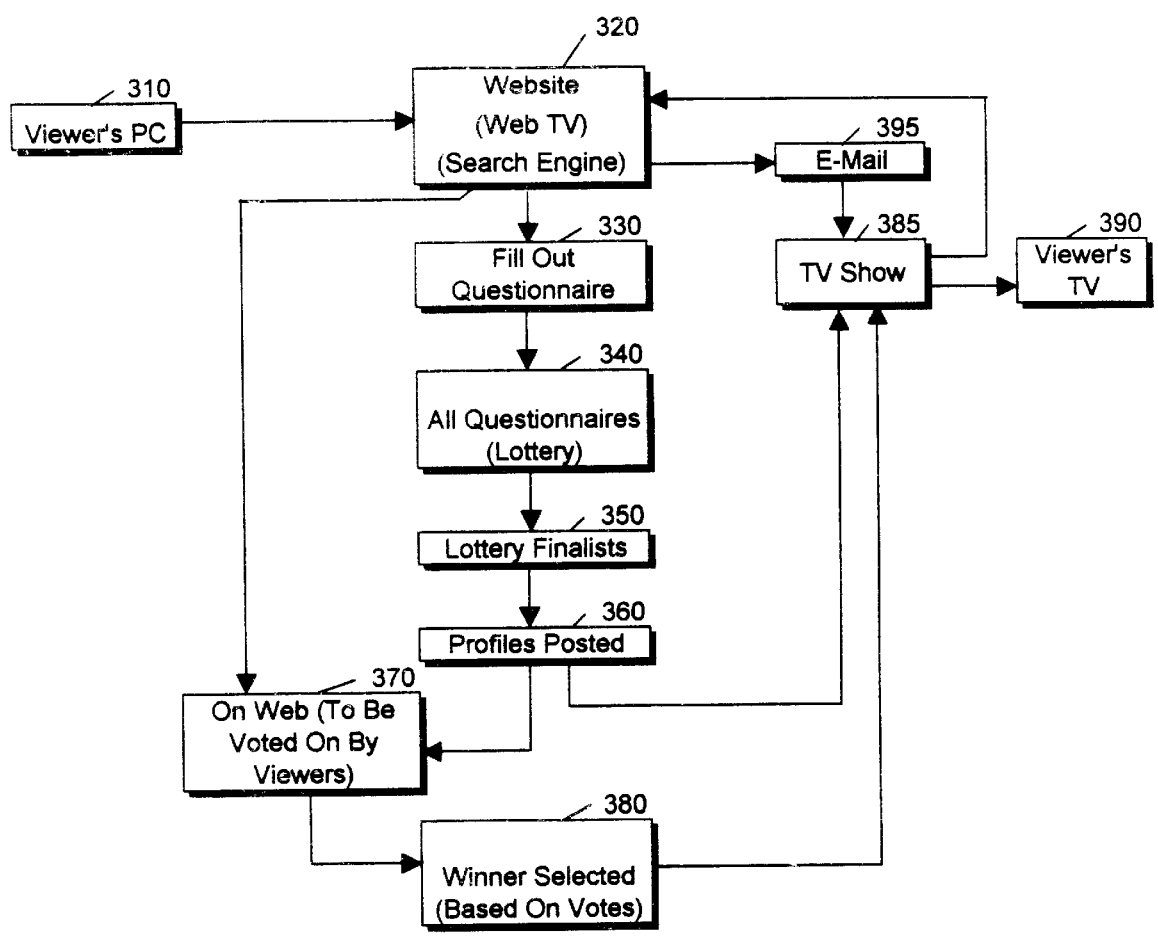
FIG. 3 is a flow chart showing the various elements of the television game show, and the relationship of the user, the Internet, and the television program, according to an embodiment of the invention.

The steps involved in processing data entries obtained from the Internet, and using the processed data entries for a live television show to be broadcast on a major television network, is shown in FIG. 3. A computer user logs into the Internet via his/her PC in step 310, and then accesses the pertinent website in step 320. The website may be accessed via a PC (and displayed on a computer monitor), or via a television that allows for both television and web display.

One of the links on the home web page is to a web page which provides a questionnaire that the user fills out in order to properly register so as to become eligible to win the prize for an upcoming week, as shown in step 330. After the user has selected the questionnaire link, he/she will be welcomed, advised of the required qualifications and rules, and asked to fill out or update a questionnaire. A user can update their questionnaire as often as they like, but there may only be one questionnaire (entry) per user. Preferably, the questionnaires will be deleted periodically, for example, twice a year, so as to require a new questionnaire to be filled out by all users who want to become eligible to win prizes in future television shows.

All questionnaires are entered into a lottery, as shown in step 340. A computer program will perform a random selection from all of the questionnaires in order to determine the finalists (e.g., select ten finalists), in step 350. The questionnaires, or profiles, of the finalists will be posted, in step 360, and will be accessible for users who select the voting link, as shown in step 370.

The voting web page can be accessed from the home web page (e.g., via a hyperlink), as shown in step 370, and/or it can be accessed (e.g., via a hyperlink) after the user has entered or updated his/her questionnaire on the questionnaire web page. Upon selection of the voting link the user will be asked to read the anonymous entries of that week's randomly-selected finalists, and the user will be asked to vote for the one finalist that the user likes best. Preferably, there will be ten finalists, but other numbers may be contemplated. Only one vote per voter is allowed, and the server will preferably have software to determine if fraudulent voting has occurred (e.g., checking cookies to see if a voter has tried to vote using different names from the same computer), and to disqualify such fraudulent votes and voters.

Based on the total number of votes for a particular set of finalists, a winner is determined, as shown in step 380, and that information is utilized in the weekly television show in which the winner's name is announced and the award to the winner is made, as shown in step 385. The user can watch the television program on the user's television, as shown in step 390.

By voting, the user (or "voter") is entered into the "Thank you" category. In more detail, information regarding the voter will be stored in a database (preferably at the server), along with other voters, where each voter will be listed along with a designation of the finalist that the voter voted for that week.

The "Thank You" will be a requirement of the new millionaire, in that the new millionaire must give at least $10,000.00 to one person who voted for him/her. The computer will randomly select ten entries from the available questionnaires, and list those ten entries on the "voter" link, whereby voters vote for their favorite entry. The winner must read the Thank You list, and select the one person he/she wishes to thank for voting for them. The new millionaire will also be required to telephone the chosen voter to award the Thank You. Alternatively, the new millionaire may be required to personally deliver the Thank You to the chosen voter.

Another feature of the invention is a Sponsor of the Week. The home web page ["MillionBucks.com"] has a link to the home web page of the Sponsor of the Week. Each week, a company will sponsor the million dollar giveaway. By becoming a Sponsor of the Week, the company will receive a prime advertising spot on the [MillionBucks.com] web page (e.g., big banner advertisement prominently placed) for an entire week. Also, the company will be provided with a directly link to their own web site, as well as being mentioned during the television broadcast and perhaps also having a logo displayed on the winner's jacket for that week's show.

Also, another link from [MillionBucks.com] is to a purchase search engine that will take a user to a web page that has names of companies who are past, present or future sponsors of the television game show. The purchase search engine will preferably provide a link to the home (or to the product/service purchasing) web page of each of these companies, as well as providing a search function for allowing a user to enter in a search term, whereby the user will be provided with the listed companies that may sell the goods or services requested by the user. For example, if the user enters in "car" as a search term, and if "Ford", "Domino's Pizza" and "U-Haul" are the past, current and future sponsors listed on the purchase search engine web page, then the user will be prompted with both "Ford" and "U-Haul" as possible companies that can serve the user's "car" need.

The "on air" link from the home web page is for interactive television. The user may enter in a question or comment via e-mail which may be displayed during the weekly television show, as shown in step 395 in FIG. 3. The television show may use past e-mails (which are preferably stored at the server computer), and/or current ones received while the television show is being broadcast live. As an added feature, the live studio audience may be polled for purchase selections and/or asked what they think of a purchase decision made by a winner.

Figure 2:
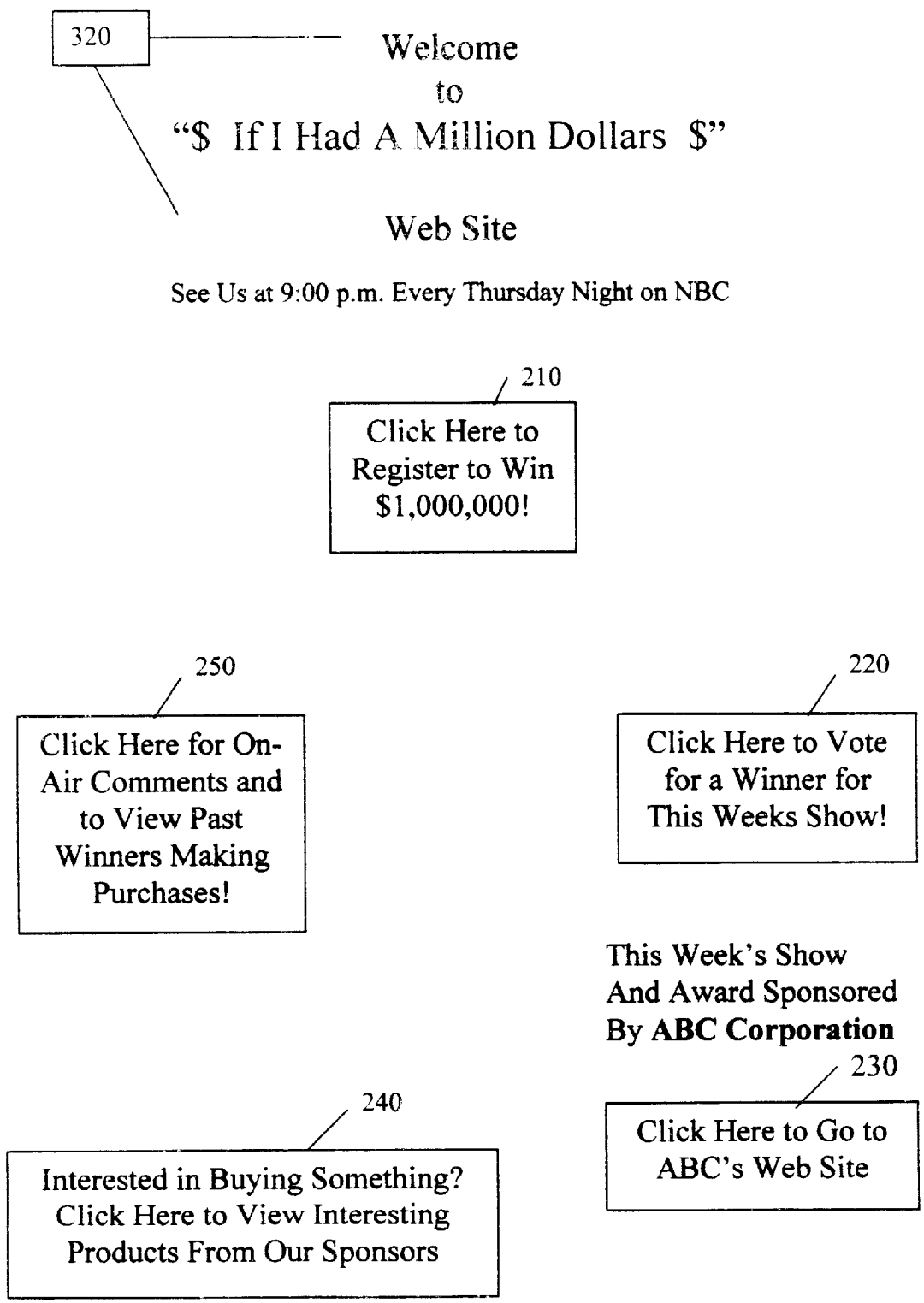
FIG. 2 is a diagram showing one example of a home web page in which a user can enter to register and vote in the game show, according to an embodiment of the invention.

FIG. 2 shows one example of a home web page [for MillionBucks.com], as well as the various links to other web pages. A first link 210 is to a web page where the user can fill out a questionnaire to register to win the prize. A second link 220 is to a web page where the user can vote for one user profile from a list of user profiles that are randomly selected. A third link 230 is to a web page of the Sponsor of the Week. A fourth link 240 is to a purchase search engine, whereby a user can enter a search term and be provided information regarding sponsors who can provide goods or services based on the entered search term. A fifth link 250 is for on-air comments and for viewing real-time video of a winner making purchases.

Figure 5:
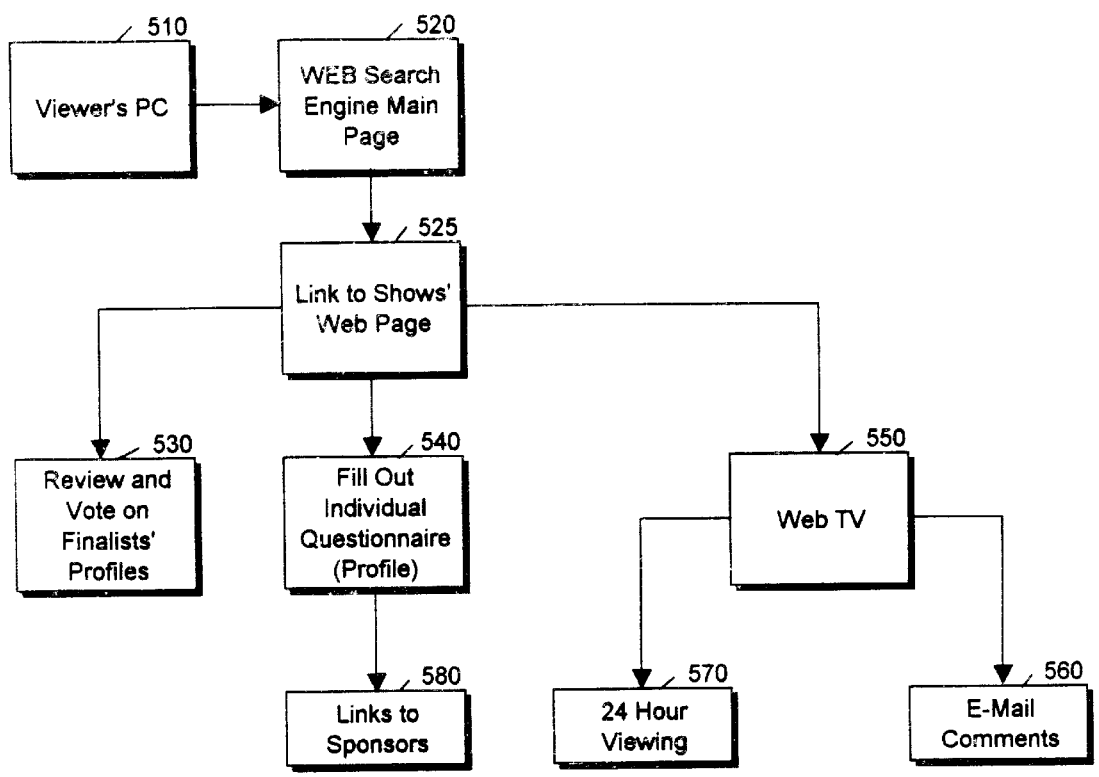
FIG. 5 is a flow chart showing the Internet web pages that are utilized in the invention and their relationship to each other, according to an embodiment of the invention.

FIG. 5 shows the hierarchical relationship of the various web pages that are utilized in the present invention, and how they relate to each other and to the television program. A viewer's PC 510 is used to access the main web page [("Millionbucks.com")] 520. On the main web page 520, links 525 are provided to other web pages, including a first web page 530 where a user can review and vote on profiles of finalists; a second web page 540 where a user can fill out a questionnaire (profile) to become eligible for a future lottery to determine finalists for a future week, and a third web page 550 whereby the user can e-mail comments 560 and whereby the user can view 570 what is currently happening with respect to past and current millionaires who are trying to spend their monetary award within the fixed time frame that they have to do it in. Preferably, at the second web page 540, the user will be provided with a link 580 to the sponsors of the television game show, so that the user can check out the goods/services offered by those sponsors and perhaps make purchases.

By way of example and not by way of limitation, a questionnaire 610 that a user must fill out to be registered, and which is listed on the second web page 540, is shown in FIG. 6. The questionnaire preferably includes topical questions and somewhat off-beat questions, to add to the interest in the game show and to differentiate users from each other. Based on answers made in the questionnaire 610, the user may be provided with link to sponsors. For example, software may be provided to look for key words in answers to the questions in the questionnaire, and based on key word hits that match key words for a sponsor, that sponsor's name will be provided, along with the key word and a link to the sponsor's home page. That way, sponsors may be able to increase their sales potential based on user's who are filling out questionnaires to enter the game show and who become interested in products of the sponsors may aware to them by virtue of the Internet web pages of the game show.

As explained in some detail above, the live weekly television broadcast will include various themes, including the live award of the $1,000,000 to a current winner, as well as updates on the spending of the $1,000,000 by winners in the past few weeks (whose time limit to spend their award has not yet run out). Also, the television show may include follow-up segments on previous winners, with a "What Ever Happened To . . . "theme. These follow-ups would cover adventures of previous winners, and/or a human interest story, good or bad. All winners would have to agree to this potential follow-up prior to being given their monetary award.

While a preferred embodiment has been described herein, modification of the described embodiment may become apparent to those of ordinary skill in the art, following the teachings of the invention, without departing from the spirit and scope of the invention as set forth in the appended claims.

What is claimed is:

1. A method for providing a television game show, comprising:

providing users access to register to win a monetary prize to be given away on the television game show, wherein the access to register is by way of Internet and wherein the registering requires each user to provide a user profile which is stored;

randomly selecting a fixed number of the stored user profiles;

providing users access to vote on one of the fixed number of randomly selected user profiles, wherein the access to vote is by way of the Internet;

determining a winner in accordance with which one of the fixed number of user profiles has a maximum number of votes.

2. The method according to claim 1, further comprising:

obtaining a sponsor to provide the monetary prize for the winner; and displaying, on same web pages which the user access to register and to vote, an advertisement for the sponsor.

3. The method according to claim 1, further comprising:

videotaping and broadcasting the winner receiving the monetary prize on a television program.

4. The method according to claim 3, further comprising:

videotaping the winner making purchases over a fixed time frame in which the winner has to spend the monetary prize in its entirety, wherein the videotaping is displayed on a web page that can be accessed on the Internet to watch the purchases in real time.

5. The method according to claim 3, wherein the television program is broadcast periodically, and wherein excerpts of the videotaping are shown on future broadcasts of the television program.

6. The method according to claim 1, wherein the providing users access to register by way of Internet is made by providing the user with a link from a home web page to first web page, and wherein the providing users access to vote by way of the Internet is made by providing the user with a link from a home web page to second web page.

7. The method according to claim 6, wherein the access to register comprises:

clicking on a link from the home web page to get to the first web page;

entering in information by way of a questionnaire provided on the first web page; and reading information concerning contest rules and clicking to indicate agreement with the contest rules.

8. The method according to claim 3, further comprising:

videotaping the winner spending portions of the monetary prize, wherein the winner has to spend an entirety of the monetary prize within a fixed time frame or else lose an unspent portion of the monetary prize after the time frame has elapsed.

9. The method according to claim 8, further comprising:

providing streaming video corresponding to the videotaping of the winner, via a web page that can be accessed via the Internet.

10. A computer program product that is used to create a television game show, comprising:

first program code that provides users access, via an Internet, to register to win a monetary prize to be given away on the television game show, wherein a user profile is created for each user as a result of the registering;

second program code that randomly selects a fixed number of the user profiles and that displays the randomly selected user profiles on the Internet;

third program code that provides users access, via the Internet, to vote on one of the randomly selected user profiles; and fourth program code that determines a winner based on one of the predetermined number of user profiles having maximum number of votes.

11. The computer program product according to claim 10, further comprising:

fifth program code that enables and receives e-mails regarding the television game show, wherein the e-mails are obtained via the Internet.

12. A television game show, comprising:

means for selecting a winner for the television game show from a plurality of candidates, based on voting made by way of an Internet web site;

means for presenting the winner with a monetary award; and means for monitoring purchases made by the winner during a fixed time period, wherein the monitoring means includes a web site for users to watch the winner make the purchases.

\* \* \* \* \*